United States Patent Office 3,557,420
Patented Jan. 26, 1971

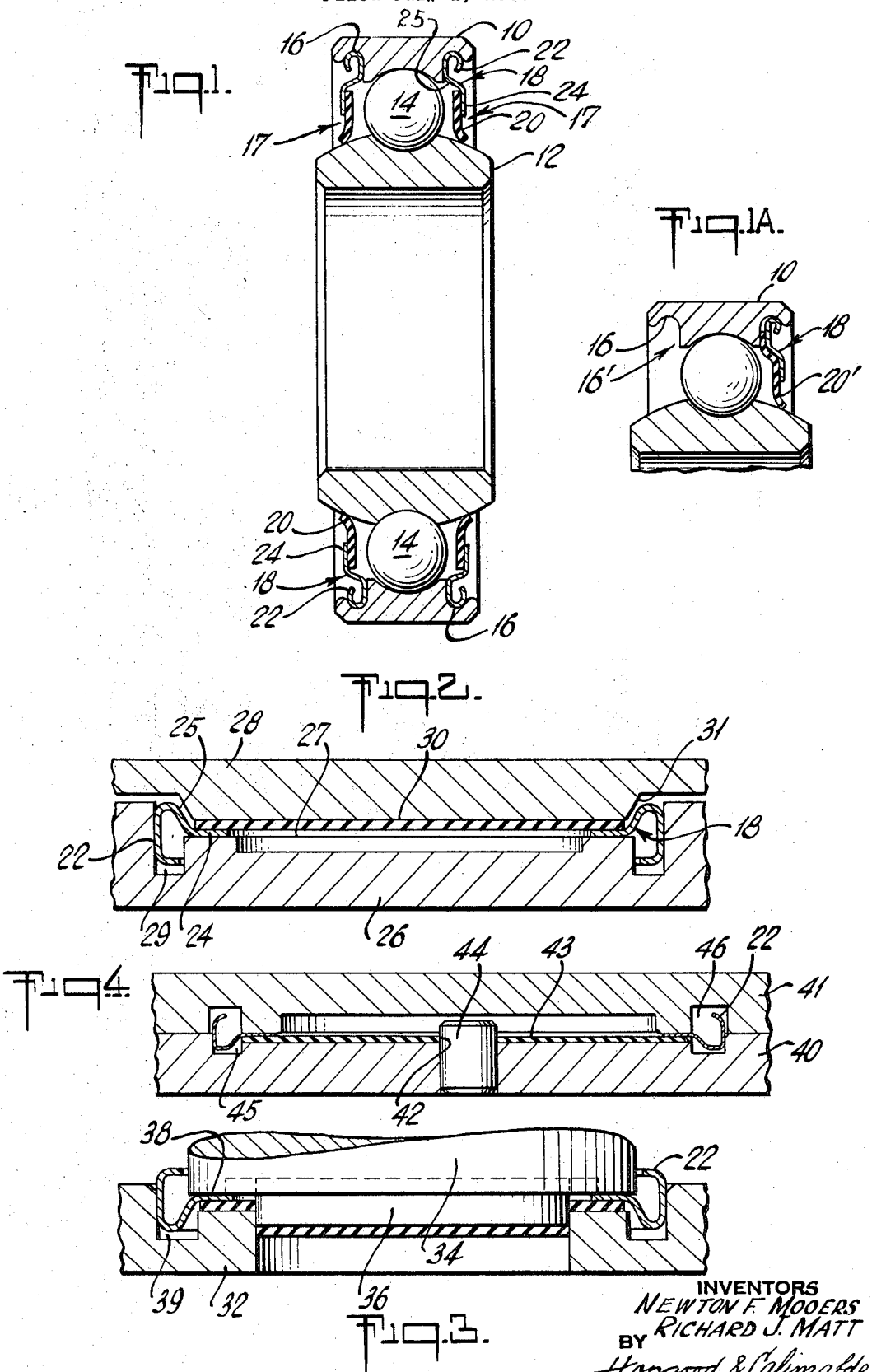

3,557,420
METHOD FOR MAKING AN ANTIFRICTION BEARING SEAL
Richard J. Matt, Simsbury, and Newman F. Mooers, Plainville, Conn., assignors to Textron Inc., Providence, R.I., a company of Delaware
Filed July 1, 1968, Ser. No. 741,658
Int. Cl. B23p *11/00;* B23q *17/00*
U.S. Cl. 29—148.4
17 Claims

ABSTRACT OF THE DISCLOSURE

A method for making an antifriction bearing seal is described. A sheet of preferably polytetrafluoroethylene is provided on one side with a curable adhesive or is otherwise prepared for bonding at one side. A plurality of diaphragms are then punched out of the sheet, so that each diaphragm is bondable on one face thereof. A metallic cap or ring member is formed having an outer annular lip portion shaped to mount to the outer ring of a bearing. The lip extends radially outwardly and axially from an inner annular flat flange to form an apertured dished face, with the flange forming the bottom of the dish. When punched, the diaphragms are shaped and sized to fit within the dish bottom and to cover the aperture with an annular overlap. Thus, upon insertion, each is piloted by the flare of the dish, to a seated bonding position, generally in the center of the bottom of the dish. After bonding, the diaphragm is punched within the ring member, to produce a hole that is precisely concentric with respect to the bearing axis, by piloting the punch on the outer lip of the ring member.

---

In the manufacture of sealed bearings, problems are often encountered with the hydraulic fluids to which the bearing is exposed. Several of the hydraulic fluids tend to attack chemical adhesives and elastomers normally employed with rubber-type bearing seals, and cause unreliable bonding of the seal material to its metal support. At high operating temperatures, such chemical attack tends to be accentuated, resulting in significant loss of reliability. In aircraft applications, it is required that the seal be resistant to a miscellaneous assortment of exotic aircraft fuels and lubricants, and a substantially chemically inert seal is highly desirable.

In sealed bearings, the seal is carried by the outer bearing ring and extends into resilient engagement with the inner bearing ring, usually around an annular portion thereof. The seal is slightly deformed by this engagement to assure a minimum lubrication leakage path between the seal and the inner ring. If the concentricity of the hole in the seal is not carefully controlled, an excessive interference between the seal and the inner ring will result in one area and an undesirably large lubrication leakage path is opened in an area on the opposite side thereof. For a given configuration, therefore, concentricity of the hole in the seal assures best sealing, as well as minimum friction, between the seal and the inner ring.

It is an object of this invention to provide an improved low-cost, chemically inert and compact seal for an antifriction bearing.

It is another object of this invention to provide an efficient method for assembling a high quality seal for a bearing.

These objects are accomplished by our invention, a preferred embodiment of which will be described in conjunction with the drawings, wherein;

FIG. 1 is a vertical sectional view of an antifriction bearing employing a seal of this invention;

FIG. 1A is a similar but fragmentary view to illustrate a modification;

FIGS. 2 and 3 are vertical sectional views through tooling used in two successive steps of our method of making a seal member; and FIG. 4 is a view similar to FIG. 2, to illustrate an alternative procedure for the bonding step.

Briefly stated, our invention contemplates an economic method for producing a high-quality seal for an antifriction bearing by forming an apertured dish-shaped outer cap or ring member, forming a diaphragm from flexible sealing material that is prepared for bonding on one side, generally centering the diaphragm within the dish, bonding the diaphragm to the dished portion, and punching a concentric hole in the diaphragm and within the aperture of the ring, by piloting the punch on the lip of the cap or ring member.

In FIG. 1, an antifriction bearing is shown wherein an outer ring 10 and an inner ring 12 are concentrically mounted with a plurality of interposed antifriction elements 14. The outer ring 10 is further provided with annular recesses 16 on opposite sides of the antifriction elements 14, to position and hold seal-insert assemblies, such as the assembly 17.

Each seal-insert assembly 17 comprises a chemically inert sealing washer 20 of suitably flexible material bonded to a metallic snap washer, cap or ring member 18. Cap 18 has an annular axially extending lip portion 22 which is crimped, rolled or staked and shaped to fit with snap-like or other retaining action, concentrically within its annular retaining recess 16. The cap 18 is further provided with an annular flat flange portion 24 extending inwardly to receive the sealing washer 20 on the antifriction element side thereof. The axial lip portion 22 is connected to the flange 24 by an axially and radially outward flare 25, so that the flange 24 is seen to form the bottom of a dish 24–25. The flare of wall 25 is used to pilot the sealing washer onto the aperture. The sealing washer is bonded to the flange portion 24 and is preferably selected for sufficient stiffness to provide a significant measure of continued sealing effectiveness, retaining bearing lubricant and keeping out contaminants, in case the bond fails.

The formation of the sealing washer 20 commences with the selection of polytetrafluoroethylene (TFE) as the preferred material. However, other materials could be used such as fluoroethylene propylene, known as FEP, although the latter material has a lower operating temperature than TFE.

Various ingredients may be added to the TFE material to impart particularly desired characteristics to the seal. For instance, the addition of fibrous material reduces the flow characteristic, or the addition of carbon renders the seal conductive and prevents an electric charge build-up that would gather dust and other contaminants. The addition of metallic solids may significantly increase the thermal conductivity of the seal to improve its sealing life.

A large-sized TFE sheet of the desired characteristics is prepared. Its thickness is sufficient to provide adequate stiffness to the sealing washer. One side of this sheet is prepared for bonding, as by provision with an adhesive coating.

The adhesive selected must meet exacting requirements. Thus, it must be capable of resisting the chemical erosion by exotic aircraft fuel oils and lubricants which tend to attack the commonly used adhesives. The bond strength between the sealing washer 20 and the cap 18 must be high, yet the use of a sandwiched washer 20 between two caps 18 to provide this strength must be rejected because of its poor space utilization. The assembly of the insert must be economical and suitable for large-scale production.

Accordingly, the preferred adhesive is one which may be applied to the TFE sheet for direct bonding to the cap and can be applied at any time independent of the time for assembling the entire insert. Thus, a polyimide adhesive, which withstands high operating temperatures, is preferred for the TFE washer 20. This adhesive is originally sprayed or brushed on as a polyamide. It is applied to a large-sized sheet, say several feet square. Preferably, the TFE sheet is first etched on the side to which the adhesive is applied by exposing the side to a suitable solution of a strong alkali such as sodium hydroxide.

The adhesive-coated sheet is then exposed to a temperature of 250° F. for 15 minutes to drive off solvents, after which the entire sheet is placed in a refrigerator for preservation at about 40° F. The adhesive in this state is partially cured and may be stored for several days before use in the assembly of inserts.

Other adhesives may be used, such as the phenolic type. Such adhesive is also sprayed or brushed on and partially cured to a "B" stage at 200° F. In this state, the TFE sheet may be kept in cold storage for from 7–14 days before further use.

In the case of lower-temperature seal material such as FEP, no special adhesive coating or preparation is necessary, inasmuch as bonding results from a controlled program of heat and pressure, applied to the seal disc and the flange to which it is to be secured.

Having selected the sheet seal material, suitably prepared for bonding on one side, a plurality of diaphragms or discs 30 are formed. These discs are punched out of the sheet and have a diameter which is greater than the hole of the cap 18 to provide an annular overlapping portion for bonding to the flange 24.

In the case of TFE sheet used in the seal of FIG. 1, the washer surface facing away from the antifriction elements 14 is supplied with the adhesive coating. This is also true for the form of FIG. 1A, where the TFE washer 20' is shown bonded to a larger area of the cap 18 to thereby in addition create a non-wetting outside diameter seal in the recess 16, and permanently axially preloaded against the adjacent shoulder 16' of the outer bearing ring 10.

To save axial space, however, the washer 20 is preferably limited in diameter to fit to the flange portion 24 of the cap 18, within the flare 25, as in FIG. 1.

Before bonding TFE diaphragm 30 to the cap or ring member 18, the adhesive-coated sheets of TFE are removed from cold storage and allowed to warm up to permit evaporation of absorbed vapors. Thereupon, the sheets may be cleaned to remove oils by wiping with a cleaning fluid such as trichloroethylene.

FIG. 2 illustrates an initial step for assembling the adhesive-coated TFE disc 30 onto the cap 18, using die parts 26–28. The cap 18 is first placed with the front surface (ultimately the outer surface) of the flange 24 resting upon a raised annular table 27 which projects from the bottom of a recess in the die or platten part 26; around the table 27, this recess is further characterized by an annular deeper recess 29 conforming to the shape of the lip 22 of the cap 18; in this position, the dished portion of cap 18 faces upwardly, to expose the outward flare of wall 25. The disc 30 is then loosely placed in the dished portion, adhesive down, relying on flared wall 25 to pilot the disc 30 to a seated position on flange 24. Thereupon, the other die part 28, which is a suitably conforming pressurizing die, is applied so that the portion of the disc 30 overlapping the flange 24, i.e. supported by table 27, can be bonded to one another, it being noted that die part 28 is cut away at 31 in order to clear the cap 18, thus assuring uniform clamp pressure at the bonding region.

The bonding step varies depending upon the type of adhesive employed. In the case of the partially cured polyimide, several intermediate temperature stages, normally with some pressure, are needed to finally cure and bond the disc 30 to the cap. Preferably, the bonding temperature is at least 350° F. and accompanied by a pressure of about 200 p.s.i. or greater but not so great as to cause excessive flow-out of the TFE disc. Such temperature and pressure are maintained for about 15 minutes. At this point, the disc 30 is sufficiently bonded to the cap 18 to permit punching of the hole (if desired), although the cure of the adhesive is not complete; in other words, at this point, the adhesive is still a polyamide. Final curing may be done at 500° F. and without pressure, to change the polyamide adhesive to a polyimide material.

Alternatively, where a partially cured phenolic adhesive is used, the bonding step is accomplished by compressing the disc 30 to the flange 24 at a pressure of about 200 p.s.i. and at a temperature between 350° F. to 400° F. for 15 minutes to a half-hour, it being realized that higher curing temperatures will be accompanied by correspondingly shorter bonding durations.

In the case of diaphragms 30 of FEP material, the press temperature is in the order of 550° to 580° F., with a pressure of about 10 p.s.i. Such elevated temperature is maintained just long enough to allow surface melting of the FEP, whereupon the temperature is lowered to about 500° F., while maintaining the pressure. To complete the bond, the pressure is maintained throughout cooling. Of course, conventional precaution must be taken against bonding to the die part 28, as by coating with a suitable parting agent.

After the disc 30 has been bonded to the metal insert 18, the center section is cut out from the washer by placing the assembly into a punch die set 32–34 (FIG. 3). The insert is placed this time with the diaphragm facing the die 32, the lip 22 being piloted in the outer wall of an annular recess 39 in the die 32. The punch 34 includes a cutting portion 36 and an annular stop 38. The stop 38 is aligned with the flange portion 24 of the insert 18. The outside diameter of the punch 34 is so sized to clear the inside diameter of the lip 22. The cutting portion 36 is thus effectively piloted on the annular outer lip 22, and concentricity of the hole cut in the washer 20 is assured.

To eliminate a costly stamping die, the cap or ring member 18 may also be stamped during the bore-punching operation shown in FIG. 3. In that event, the punch 34 is provided on its annular stop 38 with the necessary lettering to identify the particular seal assembly.

If final curing of the polyimide adhesive is required at this time, the insert assemblies may be accumulated in a basket and placed in an oven at the right temperature of about 500° F. The advantage of batch curing is evidenced by the elimination of the time-consuming step of increasing the temperature of the platens in which the original bonding step is performed at a lower temperature.

As a further alternative, we show in FIG. 4 a bonding die or platen set 40–41 particularly applicable to the assembly of larger diameter seal-insert assemblies. The important difference between the technique of FIG. 4, as compared to what has already been described, is that a small central pilot hole 42 is stamped in diaphragm 43 as part of the initial cutting from sheet seal material, and a locating pin or stud 44 projects up from the base of platen 40 for ready location of diaphragm 43. The outer wall of an annular recess 45 locates the lip 22 of the cap or ring member, when placed over the diaphragm 43. To apply bonding pressures, the upper platen 41 is recessed in the manner described for platen 26 in FIG. 2, except that the outer wall of annular recess 46 is oversize, to clear the adjacent lip portion 22. Bonding, and later precise punching of the bonded diaphragm, is performed as described in connection with FIG. 3.

Having thus described an economical process for mak- ing a seal for an antifriction bearing, variations therefrom are considered to fall within the scope of the following claims.

We claim:
1. A method for making a sealing member for an antifriction bearing, comprising forming an annular dish-shaped cap having an annular lip and a radially inwardly extending apertured flange with the flange forming the bottom of the dish, forming an adherent sealing diaphragm of flexible lubricant-resisting material and sized to provide an annular overlap when placed in radial overlap with and spanning the aperture in the flange, positioning the diaphragm for adherent contact with the side of the flange forming the bottom of the dish and generally centered over the aperture by the annular lip, bonding the diaphragm to the flange, and applying a punch piloted on the annular lip to punch a hole in the diaphragm within the flange aperture and concentric with the annular lip to form a seal insert assembly.

2. The method as recited in claim 1, wherein said cap-forming step comprises forming an annular dish-shaped cap with an annular lip extending from the flange with an outwardly diverging flared wall, and wherein said positioning step includes generally piloting the diaphragm on the diverging wall generally over the aperture in the flange.

3. The method as recited in claim 1, wherein the compressive bonding step further includes simultaneously stamping lettering on the face of the flange opposite the face provided with the diaphragm.

4. The method as recited in claim 1, wherein the diaphragm is made of polytetrafluoroethylene and is rendered adherent and is bonded by a polyimide adhesive coating that is partially cured prior to the diaphragm-positioning step.

5. The method as recited in claim 1, wherein the diaphragm is formed by forming a sheet of substantially chemically inert material of a thickness sufficient to impart stiffness to the diaphragm and coating a side of the inert sheet with a curable adhesive material.

6. The method as recited in claim 5, wherein the coating step comprises heating said coated sheet to a temperature and for a duration necessary to partially cure the adhesive and permit intermediate cold storage of the partially-cured sheet.

7. The method as recited in claim 6, wherein said sheet-forming step further comprises forming a sheet of polytetrafluoroethylene and etching one side thereof, and wherein said coating step includes coating the etched face of said sheet.

8. The method as recited in claim 6, wherein the bonding step comprises applying sufficient heat and pressure for a sufficient duration to effectively simultaneously bond the diaphragm to the cap and cure said adhesive.

9. The method as recited in claim 4, wherein the adhesive includes a polyimide material and wherein the bonding of the diaphragm to the cap is accompanied by a second partial curing of the adhesive material, exposing a plurality of punched seal inserts to further heat, and finally curing the adhesive materials in said inserts.

10. The method as recited in claim 9, wherein the final curing step comprises heating the inserts to a temperature of about 500° Fahrenheit.

11. The method as recited in claim 8, wherein the adhesive includes a phenolic material and wherein the bonding step includes heating the diaphragm and the cap to a temperature between about 350° to 400° Fahrenheit and at a pressure of about 200 p.s.i. for between 15 to 30 minutes.

12. The method of claim 1, in which the diaphragm is formed initially with a central piloting aperture and in which the piloting aperture is used in the positioning of the diaphragm with respect to the flange, said central piloting aperture being of smaller diameter than that of the hole produced by said punch.

13. The method as recited in claim 1, wherein the diaphragm is formed of fluoroethylene propylene and is rendered adherent and is bonded by a polyimide adhesive coating that is partially cured prior to the diaphragm-positioning step.

14. The method as recited in claim 13, wherein said fluoroethylene propylene diaphragm bonding step includes
applying pressure and heat to said diaphragm sufficient to cause surface melting of the fluoroethylene propylene followed by cooling to bond the diaphragm directly to the flange.

15. The method as recited in claim 14, wherein said diaphragm bonding step further includes
applying heat and pressure to said diaphragm sufficient to raise the temperature thereof in the order of 550° to 580° Fahrenheit at a pressure of about 10 p.s.i. following by cooling while maintaining the pressure.

16. The method of claim 5, wherein final cure to polyimide proceeds at elevated temperature and at substantially ambient pressure after punching said hole.

17. The method of claim 1, wherein the diaphragm is made of polytetrafluoroethylene and is rendered adherent and is bonded by a phenolic adhesive coating that is partially cured prior to the diaphragm-positioning step.

References Cited
UNITED STATES PATENTS

| | | | |
|---|---|---|---|
| 116,636 | 7/1871 | Selden | 29—406X |
| 3,206,829 | 9/1965 | Schaeffler et al. | 29—148.4S |
| 3,226,168 | 12/1965 | Recknagel | 308—187.1 |
| 3,268,984 | 8/1966 | Kupchick | 29—149.5 |

THOMAS H. EAGER, Primary Examiner

U.S. Cl. X.R.
29—149.5, 406; 308—187.1